United States Patent

Verhagen

[15] 3,672,473
[45] June 27, 1972

[54] PENDULUM SYSTEM

[72] Inventor: Cornelis M. Verhagen, c/o Datawell N.V., Zomerlustraat 4, Haarlem, Netherlands

[22] Filed: Dec. 30, 1970

[21] Appl. No.: 102,875

[52] U.S. Cl. .................................. 188/266, 73/430, 188/1 B
[51] Int. Cl. ........................................ F16d 57/00, F16f 9/00
[58] Field of Search ............................. 73/430; 188/266, 269

[56] References Cited

UNITED STATES PATENTS

| | | | |
|---|---|---|---|
| 3,294,467 | 12/1966 | Rademakers | 188/1 B UX |
| 3,557,628 | 1/1971 | Tsukada | 73/430 X |
| 3,580,364 | 5/1971 | Verhagen | 188/1 B X |

*Primary Examiner*—Duane A. Reger
*Attorney*—William J. Daniel

[57] ABSTRACT

The invention provides a pendulum system for stabilization purposes, provided with a liquid-filled vessel and a body suspended therein, said body being of synthetic material having a density deviating little from 1 g/cm$^3$ the liquid being water containing substances such as glycerol, and/or sorbitol and/or glycol dissolved therein and the density difference of liquid and synthetic material being smaller than 1 percent of the material density in the temperature range from $-5°$ C to $+35°$ C.

6 Claims, 1 Drawing Figure

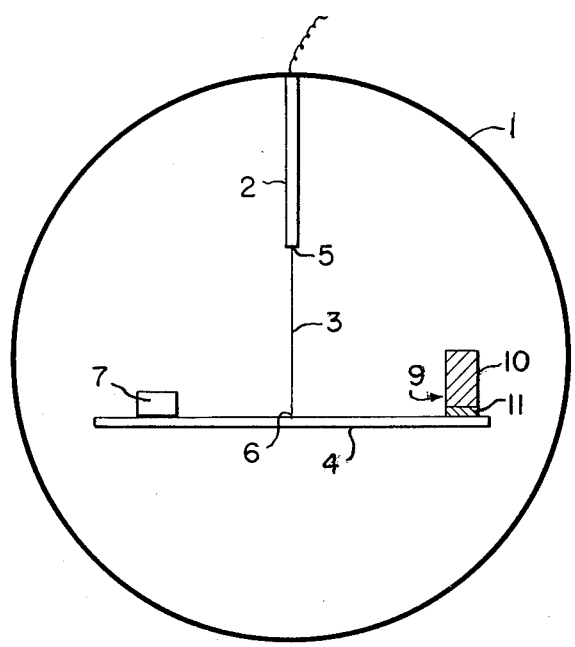

PENDULUM SYSTEM

The invention relates to a pendulum system provided with a liquid-filled vessel and a body suspended therein, the weight of which differs very little from the liquid volume displaced by the body.

A similar pendulum system has been described in the U.S. Pat. specification No. 3,294,467 to P.J. Rademakers.

Such pendulum systems have extremely long oscillating periods for their dimensions, as the drive back force of the pendulum is proportional to the difference between the weight of the body and the liquid volume displaced by it, while the mass corresponds with the weight of the body and the liquid volume moving along with the body. When with such systems use is made of metal bodies, which are floated by means of gas chambers, balancing the system requires much work, as the volumetric center of gravity of the body must be in the same vertical as the center of gravity and its suspension point in connection with the position of the body in the gravity field. This requires balancing in two mutually perpendicular directions. The body can tilt with respect to its suspension point. The resulting tilting oscillation in practice is of great importance. In order to obtain a long period of said tilting oscillation, it is necessary that the upward force and/or the weight are regulated such that under the influence of gravity the required tilting stiffness is obtained.

For limiting the balancing work only very small tolerances may, in view of the great differences in density of metals and liquids, be applied when manufacturing the metal body.

As air and metal of the suspended metal body have been balanced together without any distinction, said balance will run with the variation of the density of the liquid as function of the temperature, with which it is pointed out that the change in density of metal with respect to the liquid can be neglected. If a body consists of two substances having different densities (in this case also air and metal), both the substances each for them must be in balance with respect to the suspension point in order to maintain the balance when variations in the density of the surrounding liquid occur. This, however, requires new balancing adjustments, and the tilting stiffness in this case again has to be regulated for at least two densities of the liquid. Because generally speaking the balancing with one density of the liquid cannot be regulated without influencing that with an other density, too, balancing will have to be repeated for several times. In practice such systems consequently are balanced with one density.

So far with such systems having dimensions of 0.3 m for a temperature range of −5°C to +35°C and an orientation deviation within 1° an oscillation time can be attained of 5 to 10 seconds.

It is possible to increase the oscillation time by keeping the temperature of the liquid constant by means of a thermostat regulation and when the temperature of the liquid is kept constant within 0.5°C, an oscillation period of 30 to 60 seconds is attainable.

The invention aims at providing a system, with which oscillation periods can be obtained of 75 to 150 seconds without thermostats and with which the manufacture requires only normal tolerances and balancing and regulations for the tilting stiffness are cancelled.

This is obtained because the body is of synthetic material having a specific gravity deviating a little bit from 1 g/cm³ and because the liquid contains water and substances dissolved therein, the difference in densities of the liquid and the synthetic material in the temperature range of −5°C and +35° C being smaller than 0.5 percent of the density of the synthetic material.

By this a relatively great tolerance is admissible causing only a small and consequently admissible non-balance of the body.

It has appeared that there are synthetic materials which meet the requirements of easy manufacture, sufficiently constructive stiffness (elasticity modulus), and a density that deviates only a little bit from 1.0 and a good density stability when immersed in a water-containing liquid due to very little absorption in the course of time.

In order to find a liquid having the same density and coefficient of expansion as the synthetic material, water is, as has already been said, a necessary component, because the coefficient of expansion when using the density maximum at 4°C in first approximation is adaptable to that of the synthetic material. Hereby it is pointed out that liquids generally have greater coefficients of expansion than solid substances, so that the small coefficient of expansion of water in the neighborhood of 4° C is useful.

On the other hand it is of importance for applying the invention for measuring apparatus, especially for electrical measuring apparatus, that the liquid is very little electrically conductive. When this is not the case the measuring results will be affected owing to insulation leakages, especially because an important application field of the invention lies in measuring velocities in water wave. Acceleration meters, suitable herefor, often have a very high ohmic output.

The further components of the liquid consequently must not only meet the obvious requirements of a good mixability with water and that together with water a density and coefficient of expansion are obtained, corresponding with the synthetic material, but moreover must not or hardly lead to electrical conduction. For this purpose sugar alcohols, especially glycerol and/or sorbitol, eventually combined with glycol have proved to be favorable.

The connection between the density and the temperature of water in the range of −5° C to +35° C shows, apart from a linear term, also higher order terms. These form the limit of the parallellism in density of liquid and synthetic materials which can be obtained.

The non-linear term of the water causes after a linear compensation an almost square variation of the density with the temperature in the shape of a parabola, the top of which lies at a difference in density 0 and at about the average temperature (15° C). At the limits of the temperature range −5°C to + 35° C with the above mentioned preferred embodiment of the invention the liquid density is about 0.1 percent greater than the density of the synthetic material.

As adjustment for floating is far more simple than adjustment for a difference in density the correct mixing ratios of the liquid components is carried out to obtain the desired degree of floating. If, however, the center of gravity and the buoyancy center of the body coincide completely, the system has no tilting stiffness at all. If one, moreover, causes the suspension point to coincide with the center of gravity no tilting stiffness will be imparted to the system either when a difference in density between liquid and synthetic material occurs.

Further a small, but controlled stiffness can be introduced according to a further elaboration of the invention, by providing the body with a mass dipole which in its totality meets with a buoyancy in the liquid, which nearly equals its weight, said dipole consisting of a synthetic material having a specific gravity smaller than that of the liquid and a very small amount of metal, the center of gravity of the synthetic material mass of the dipole and that of its metal being vertically spaced from each other. The connecting line of the centers of gravity of the lighter synthetic material and metal gives the direction of the dipole.

The synthetic material of the dipole e.g. has a density that is 10 percent smaller than the density of the synthetic material which has been used for the body.

When in this way a controlled tilting stiffness (which is small and corresponds with a very long tilting period) has been introduced, it is desired to suspend the body in its center of gravity, in order to prevent changes in the tilting period when changes in temperature occur.

The invention is in the following further elucidated by means of the drawing, in which a section through an embodiment of the invention has schematically been shown.

Reference 1 indicates a closed spherical vessel, to which a permanent radial bar 2 is attached, to the lower end of which a suspension thread 3 is attached, which at 6 is attached to the body 4. Said body consists of a platform of synthetic material and an acceleration meter 7, which mainly consists of the same synthetic material as the platform 4. Said platform is of a synthetic material such a polycarbonate or polystyrene having a specific gravity, differing little from 1 g/cm³. Moreover the synthetic material has been selected such that its weight in the liquid is not affected by liquid absorption. As the suspension point 6 is very near to the center of gravity of the body 4, the tilting stiffness of the body 4 with respect to the point 6 in itself is very small. In order to give the platform a permanent orientation a dipole 9 has been mounted, which consists for a considerable part of a body of synthetic material 10 and a small part of a metal body 11. The bodies 10 and 11 together have a density equalling the density of synthetic material 4. Dipole 9 can be formed by parts of the acceleration meter 7.

Because dipole 9 in itself has already in a high approximation the specific gravity of the synthetic material of the body 4, the location of the dipole 9 on the platform 4 is not critical. A device of the type described can be manufactured with normal manufacturing tolerances, thereupon the flotation can be regulated by means of glycerol and/or sorbitol, eventually combined with adding glycol to the water in the vessel 1, after which a platform having a diameter of 0.3 m has without further regulation an oscillation period in the range of 75 to 150 seconds, while the horizontal orientation for a long time will not deviate more than 1° in the complete temperature range of −5°C to +35°C. Said temperature range is ample sufficient for measurements in sea and other water, e.g. for wave phenomena. The very long tilting period sees to it that the horizontal accelerations of the waves do not tilt the platform, which enables a very high measuring accuracy, of e.g. vertical accelerations.

What I claim is:

1. A pendulum system of the type having a liquid-filled vessel and a body suspended therein, and characterized in that said body consists essentially of a synthetic material having a specific gravity substantially equal to 1 g/cm³ and said liquid consists essentially of water having at least one substance dissolved therein, the difference between the liquid density and the synthetic material density over the temperature range of −5°C to +35°C being less than 1 percent of the material density.

2. A pendulum system according to claim 1, in which the dissolved substances are substantially non-ionizing.

3. A pendulum system according to claim 1, in which the dissolved substance is at least one of glycerol, sorbitol, or glycol.

4. A pendulum system according to claim 1, in which the body includes a mass dipole, which considered as a whole has a buoyancy in the liquid approximately equal its weight, said dipole consisting of a synthetic material of lower specific gravity than said liquid and a relatively small amount of metal.

5. A pendulum system according to claim 1, in which the metal of the dipole is formed at least in part by the metal of a measuring instrument.

6. A pendulum system according to claim 1, in which the body is suspended at its center of gravity.

* * * * *